UNITED STATES PATENT OFFICE.

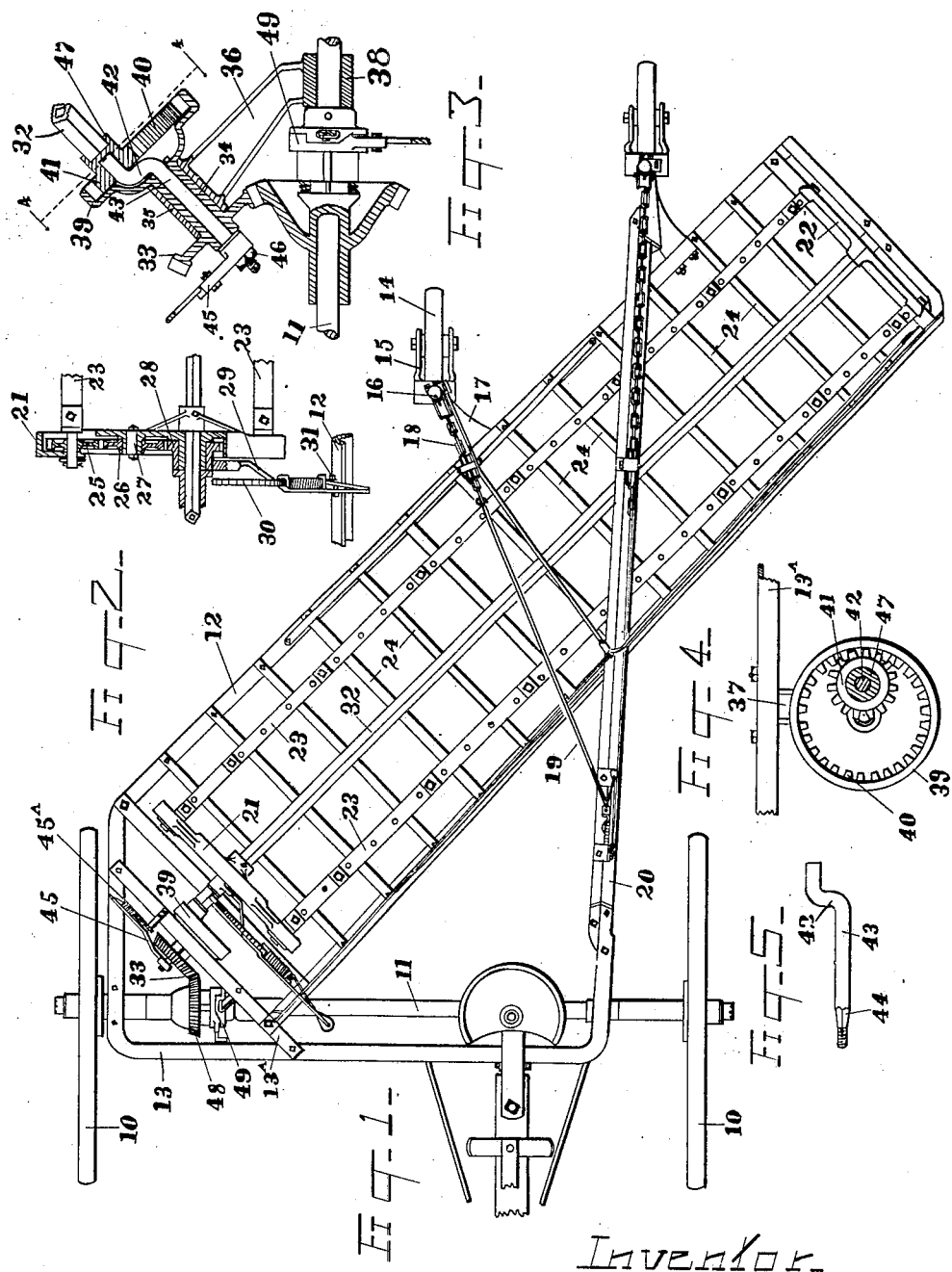

HERMAN MOSCHEL, OF OTTUMWA, IOWA, ASSIGNOR TO THE DAIN MANUFACTURING COMPANY OF IOWA, OF OTTUMWA, IOWA, A CORPORATION OF IOWA.

SIDE-DELIVERY ROTARY RAKE.

1,371,511.      Specification of Letters Patent.      Patented Mar. 15, 1921.

Application filed July 10, 1919. Serial No. 309,837.

*To all whom it may concern:*

Be it known that I, HERMAN MOSCHEL, a citizen of the United States, and a resident of Ottumwa, in the county of Wapello and State of Iowa, have invented certain new and useful Improvements in Side-Delivery Rotary Rakes, of which the following is a specification, reference being had to the accompanying drawings.

This invention relates to side-delivery rotary rakes of that type wherein a frame carrying the rotary reel journaled therein is arranged at an angle to the line of draft, such reel carrying several series of rake teeth, all of which teeth are maintained at substantially the same angle so as to be presented in the same manner to the hay that is to be raked into windrows. Said several series of teeth are held in the desired uniform working position by the employment of suitable mechanism that is carried by the forward or inner reel-head, such mechanism comprising, ordinarily, a set of gears in connection with each tooth bar and a single other gear that lies centrally of the several sets and is in mesh with the inner gear of each of said sets.

It has been the common practice to provide at the rear of the diagonally-arranged reel-frame means for supporting such frame, such means usually being one or more caster-wheels, and between these caster-wheels and the frame a relative adjustment could be effected, the frame during such adjustment turning about the main axle of the machine as an axis. In such adjustment, of course, it is evident that the outer or rear end of the frame and the outer or rear end of the reel supported therein would move through a greater arc than the forward or inner end of the frame and reel, and as it is sometimes deemed desirable that the other or inner end of the reel be given a greater amount of vertical movement than is given to such end by the character of adjustment referred to above, various attempts have been made to provide for this supplemental adjustment, but such supplemental adjustment has always been, so far as I know, of a character that affected the frame itself. It is the object of this invention to provide means for separately and independently adjusting the inner end of the reel as distinguished from any adjustment of the frame that carries the reel with it. I accomplish this object by the means shown in the drawings and hereinafter particularly described. That which I believe to be new is set forth in the claims.

In the drawings,—

Figure 1 is a top or plan view of a side-delivery rotary hay rake embodying my improved means for effecting a vertical adjustment of the reel with respect to its supporting frame;

Fig. 2 is a sectional detail of the forward or inner reel-head and the gearing carried thereby, and showing also the means for adjusting such gearing to effect a change in the angle of the rake-teeth;

Fig. 3 is a detail, being a horizontal central section through the means that operatively connect the main rotating axle of the machine with the reel-shaft, and by a portion of which means the reel-shaft can be adjusted vertically;

Fig. 4 is a detail, being an inner face view of the internally-geared head carried by and rotatable with the bevel pinion that is driven from the driving gear on the axle of the machine, showing also the pinion that is in constant mesh with the internal gear of said head. Some parts are shown in section, the section being taken at line 4—4 of Fig. 3; and Fig. 5 is a detail of the pin on the cranked end of which is loosely mounted the pinion that meshes with the said internal gear of the head.

Referring to the several figures of the drawings,—10—10 indicate a pair of carrying wheels mounted upon an axle 11 and such axle will be so connected with the wheels as to be rotated during the forward movement of the machine, but not rotated when the machine is backed. Such connecting means between an axle and a wheel are well understood in the art, and, therefore, I have not deemed it necessary to here illustrate the same. 12 indicates an ordinary diagonally-disposed reel-frame which is connected with the axle 11 so as to rock freely thereon when the frame is adjusted relative to its usual rear ground-engaging support or supports. As shown, the connection of the frame with the axle is by means of a bent supplemental frame section 13 that is rigidly connected with and forms an extension of the main frame 12, 13ᵃ indicating a diagonal frame member that connects the transverse front bar and one of the side bars of the supplemental frame member 13 together, and to which diagonal frame member 13ª, it will be noted, the front bar of the frame 12 is bolted. This diagonal frame member 13ª is here treated and considered as a part of the reel-frame inasmuch as it is connected to the parts that constitute the frame proper and also because, as pointed out hereinafter, it serves as a support for part of the actuating devices of the reel. Two ground-engaging supports are shown, each comprising a caster-wheel 14 located in rear of the diagonally-extending reel-frame 12. Each caster-wheel is mounted in a yoke 15 from which rises a standard 16 that has a sliding connection in bearings carried by an arm 17 projecting rearwardly from the frame. From each standard extends a connection that comprises a chain member 18 and a link member 19, the forward ends of the link members of both the connections being pivotally secured to a common adjusting lever that is mounted on the usual long truss bar 20 that extends from the wheeled support back and over the reel-frame. The chain members 18 of each of these connections pass under suitable pulleys journaled on the reel-frame so that when a pull is exerted on the connections 18—19 by means of their common lever on the truss bar the frame and the reel carried by the frame will be adjusted vertically relative to the supporting caster wheels. The details of this frame-adjusting mechanism are fully shown and described in the pending allowed application of Leon R. Clausen, Serial No. 129,877.

The reel that is rotatably mounted in the frame 12 comprises two heads connected together by a plurality of bars, to which bars the rake-teeth are connected in the usual manner. The inner or forward one of these reel-heads is indicated by 21 and the outer or rear reel-head is indicated by 22. The tooth bars above mentioned are indicated by 23, and, as is usually the case, three such bars will be employed. 24 indicate guards that are secured to the front and rear members of the reel-frame, their function being to strip from the rake-teeth any hay that might tend to be carried around by the teeth.

The inner or forward reel-head 21 will have rotatably secured on its outer face a plurality of sets of gears, one set being provided for each tooth bar, the outer gear of each set being keyed or otherwise secured to the forward end of one of the tooth bars as usual. In Fig. 2 is shown a sectional view through one of these sets of gears, the outer one of the set—being the one through which one of the tooth bars extends and to which it is secured—being indicated by 25, and the other member of the set shown being indicated by 26—the gear 26 being journaled upon a pin 27 made fast to the reel-head.

Each gear member 26 of the several sets is in mesh with a smaller central gear 28 which is normally held against rotation, but which on account of its being mounted upon a cylindrical hub member, as shown, may be rocked on such hub member in order to effect a change in the position of the several tooth bars so as to incline to the desired extent the rake-teeth that are carried by such bars. In said Fig. 2 there is shown a lever and movable sector construction, by the use of which this rocking of the central gear may be accomplished. The lever is indicated by 29. It is rigidly fixed at its inner end to the central gear 28 and its outer end portion extends alongside of the sector referred to so as to be locked thereto at any desired point by means of an ordinary spring latch on the lever. The sector referred to is indicated by 30. It is pivotally attached at 31 to the front bar of the reel-frame 12. This lever and pivoted sector construction is set forth more in detail in Letters Patent No. 1,283,674, dated October 29, 1917, granted upon the application of one Leon R. Clausen.

32 indicates the usual central shaft of the reel and upon which the reel-heads 21 and 22 are suitably secured so as to rotate therewith, the shaft being preferably angular in cross-section as shown. Inasmuch as the inner or forward end of the reel-shaft is adjusted up and down as hereinafter described, the bearing for the other end of the shaft must, of course, be large enough so as not to offer any obstruction to such adjustment— in other words, that outer end bearing must be so shaped as to permit a limited rising and falling movement of the shaft when the inner end of the shaft is vertically adjusted. To permit of this independent adjustment of the inner or forward end of the reel-shaft without in any manner interfering with its free rotation I provide the following construction and arrangement of parts.

33 indicates a bevel gear provided with a comparatively long hub 34 which is journaled in a bearing 35 that is best made in the form of a two-part cylindrical boxing for convenience of assembling the parts, the two parts being bolted together, as usual, and held in place in the construction shown by arms 36 and 37 extending, respectively, from the axle 11 and the frame bar 13ª. The arm 36 is shown as formed integral with one member of the bearing 35 and having at its forward end a sleeve portion 38 that surrounds the axle. The inner end of the elongated hub 34 carries an annular flanged head 39 which, as shown, is preferably made integral with the hub member. On the inner face of the flange of the head 39 are formed teeth that constitute an internal gear, indicated by 40, with which there is constantly in mesh a pinion 41 that is rotatably mounted upon the cranked end 42 of a shaft 43 the body of which passes through and is journaled in the elongated hub 34. The outer end of the cranked shaft 43 is squared or faced as at 44 (see Fig. 5) to adapt it to have non-rotatably fitted thereon a lever 45 which will be held to the crank shaft by a nut 46 secured against it as shown. The lever can be locked in any desired adjusted position by means of an ordinary latch (not shown) carried by it that engages a notched segment 45ª secured to the framework. The pinion 42 has a projection 47 extending centrally from that face that lies opposite the end of the reel, and said projection is provided with an angular recess of a size and shape to properly receive and hold the end of the angular reel-shaft 32, as clearly shown in Fig. 3.

Upon the axle 11 there is mounted a bevel drive gear 48 which will be connected to the axle at will by any suitable clutch mechanism,—such a clutch mechanism being indicated generally by 49. The gear 48 is in mesh with the gear 39 and through such intermeshing the reel will be driven. In this driving operation it is, of course, evident that as the bevel gear 33 rotates it carries around with it the annular head 39 that is made fast to the hub of the gear 33. Such rotating of the head 39 necessarily rotates the pinion 41 that is journaled on the crank 42 of the cranked shaft 43 because such pinion is in constant mesh with the internal gear 40 of such head, and by reason of the reel-shaft being fixedly secured in the central socket of the pinion 41 such reel-shaft is properly rotated. During the rotation of these parts as described, the lever 45 is, of course, held in locked position and thus no movement, other than the rotating one described, can be had by the shaft-holding pinion 41. However, if it be desired to raise or lower the inner end of the reel a stroke of the lever 45 in the proper direction will, of course, turn the crank shaft 43 and thus cause a movement up or down of the pinion 41 and the reel-shaft carried thereby, the pinion, of course, turning to bring it to a higher or lower position in the head 39, but by reason of the radius of the crank of the shaft 43 it always remains in contact with the internal gear, and hence in whatever position it may be adjusted to it will be rotated as before described and so rotate the reel-shaft. It is evident that as the crank shaft 43 is turned to carry the pinion 41 either up or down from the position shown in Fig. 4, it will necessarily carry the reel-shaft slightly forward or to the rear, but such forward or rear movement will not be to an extent sufficient to impair the raking function of the reel nor will such slight forward and back movement be interfered with by reason of the fact that the gear mechanism carried by the reel-head 21 is connected through the lever 29 and sector 30 with the front bar of the rigid reel-frame. If such connection of the reel-head gear mechanism with the frame were of a rigid character it would interfere with the adjustment of the reel-shaft as described, but by reason of the sector being pivoted in place, as described, it will yield sufficiently when required so that no such possible interference with the free adjustment of the reel-shaft can occur.

What I claim as my invention and desire to secure by Letters Patent, is—

1. In a rotary rake, the combination of a wheeled support comprising a rotating axle, a frame in rear of said support and connected therewith, a reel on said frame comprising a shaft rotatably supported at one of its ends in said frame, means for rotating and vertically adjusting the other end of the shaft, said means comprising a head having an internal gear, a crank-shaft projecting into said head, a pinion rotatably mounted upon a turned end of the crank-shaft and in mesh with said internal gear and affixed to one end of said shaft, means for rotating said head, and other means for turning said crank-shaft.

2. In a side-delivery rotary rake, the combination of a wheeled support comprising a rotating axle, a diagonally-arranged frame in rear of said wheeled support and connected therewith, a rotatable reel in said frame comprising a shaft, a driving gear and a driven gear on the axle and frame, respectively, for rotating said reel-shaft from the axle, a pinion affixed to the inner end of the reel-shaft and having its axis eccentric to the axis of said driven gear, means connecting said pinion with said driven gear and constantly rotating it therefrom during the forward motion of the machine, and means for vertically adjusting said pinion and the reel-shaft connected therewith.

3. In a side-delivery rotary rake, the combination of a wheeled support comprising a rotating axle, a frame connected to said support and extending diagonally in the rear thereof, a reel comprising a shaft journaled at its outer or rear end in said frame, a driving gear and a driven gear on the axle and frame, respectively, for rotating said reel-shaft from the axle, a pinion affixed to the inner end of the reel-shaft and having its axis eccentric to the axis of said driven gear, means connecting said pinion with said driven gear and rotating it therefrom during the forward motion of the machine, a crank-shaft journaled in the hub of said driven gear and upon the cranked end of which said pinion is mounted, and a lever connected to said crank-shaft for rocking it.

4. In a side-delivery rotary rake, the combination of a wheeled support, a diagonally-arranged frame in rear thereof and connected therewith, a rotatable reel in said frame comprising a shaft, a pinion affixed to the forward end of said shaft, a rotating member having an internal gear with which said pinion is in constant engagement, a crank-shaft on which said pinion is journaled, means for rocking said crank-shaft to vertically adjust the pinion and the reel-shaft attached thereto, and means actuated by the forward movement of the machine for driving said rotatable member.

5. In a side-delivery rotary rake, the combination of a wheeled support, a diagonally-arranged frame in rear thereof and connected therewith, a rotatable reel in said frame comprising a shaft, a pinion affixed to the forward end of said shaft, a rotating member journaled in the frame and having a gear at one end and a head with an internal gear at the other end, a crank-shaft journaled in said member and having said pinion rotatively mounted on its cranked end, said pinion being constantly in mesh with said internal gear, means for rocking said crank-shaft to vertically adjust the pinion and the reel-shaft attached thereto, and means actuated by the forward movement of the machine for driving the gear of said rotatable member.

6. In a side-delivery rotary rake, the combination of a wheeled support comprising a rotating axle, a frame connected to said support and extending diagonally to the rear thereof, a reel comprising a shaft journaled at its outer or rear end in said frame, a pinion affixed to the other end of said shaft, a rotatable head having an internal gear in constant mesh with said pinion, a crank-shaft upon the cranked end of which said pinion is rotatably mounted, means for turning said crank-shaft to adjust the pinion relatively to said head and to vertically adjust the shaft to which the pinion is affixed, and means for driving said head from said rotating axle.

7. In a side-delivery rotary rake, the combination of a wheeled support comprising a rotating axle, a frame connected to said support and extending diagonally to the rear thereof, a reel comprising a shaft journaled at its outer or rear end in said frame, a gear journaled in the frame adjacent to said inner end of the shaft, a head connected with said gear and provided with an internal gear, a crank-shaft passing through said first-mentioned gear, a pinion affixed to said reel-shaft and rotatably mounted on the cranked end of the crank-shaft and in constant mesh with said internal gear, means for turning said crank-shaft to adjust the pinion relatively to said head and to vertically adjust the shaft to which the pinion is attached, and means for rotating said first-mentioned gear and its attached head from said rotating axle.

8. In a side-delivery rake, the combination of a wheeled support comprising a rotating axle, a diagonally-arranged frame pivotally connected with and in rear of said wheeled support, a reel rotatably supported in said frame and comprising a shaft, means for rocking said frame to adjust it and the reel vertically, gears on the axle and frame, respectively, and operatively connected with each other, a crank-shaft journaled in the hub of the said gear on the frame, a pinion journaled on the crank portion of said shaft and fixedly connected to the inner end of the reel-shaft, a rotary head connected with and driven by said last-named gear and provided with an internal gear that is constantly in mesh with said pinion, and means for vertically adjusting said pinion to cause a vertical independent adjustment of the reel.

HERMAN MOSCHEL.